3,266,876
FERROUS WELD DEPOSIT AND STRUCTURE

William T. De Long, West Manchester Township, York County, and Edwin R. Szumachowski, Springettsbury Township, York County, Pa., assignors to The McKay Company, Pittsburgh, Pa., a corporation of Pennsylvania
No Drawing. Filed July 9, 1964, Ser. No. 381,574
4 Claims. (Cl. 29—196.1)

This invention relates to a ferrous weld deposit and structure and more particularly to a welding steel, i.e., a steel which can be weld deposited, which has important improved characteristics. Our improved welding steel is superior to previously existing welding steels in developing a combination of high strength and good notch toughness at −320° F. Many materials which are impact resistant at temperatures in the range of −100° F. lose their resistance as the temperatures are reduced to liquid nitrogen levels.

The handling and processing of liquified gases such as nitrogen which boils at −320° F. has been increasing at a rapid rate. The requirements for the materials used in constructing the equipment are good strength, good notch toughness at −320° F. and lower, and economy. Strength and economy are related, since the designer in most cases is allowed to base his design stresses upon the tensile strength of the material, allowing a suitable factor of safety. Thus at equal cost per unit volume, a material with high tensile strength is more favorable than a material with low tensile strength, since the wall thickness of the equipment can be reduced. The notch toughness is usually determined by means of a Charpy V notch impact test. The minimum acceptable values are usually 20 or 30 foot pounds at the operating temperature of −320° F. We use 20 ft. lbs. as a general criterion.

Present welding steels leave much to be desired. The austenitic stainless steels, such as Types 308, 309 and 310, have room temperature tensile strengths of approximately 85,000 p.s.i. although their Charpy V notch impact values at −320° F. are 20 to 35 foot pounds. Higher strength austenitic-ferritic welding steels such as Types 312 and 349 have tensile strengths of approximately 110,000 p.s.i. but have impact values well below 20 foot pounds at −320° F. The high strength chromium manganese steels described in Patents Nos. 2,789,048, 2,789,049 and 2,711,959 also have very high strengths but unacceptable impact properties at −320° F. The conventional austenitic manganese welding steels when properly made with low phosphorus as described in Patent No. 2,855,660 containing high carbon and varying additions of copper, nickel, chromium and molybdenum, have a room temperature tensile strength of approximately 115,000 p.s.i. and good impact resistance down to −100° F. or −200° F., but are no longer satisfactory in impact value at −320° F. Many commercial high nickel and cobalt base alloys, such, for example, as Monel, Inconel and Hastelloy analyses, have excellent impact values at −320° F. but are expensive and their room temperature tensile strengths are generally well below 100,000 p.s.i. The expense and difficulty of welding cryogenic plate materials with nickel base electrodes have retarded the more extensive use of such materials.

We have discovered that superior strength combined with excellent Charpy V notch impact values at −320° F. may be developed in welding steel by the proper balancing of carbon, manganese and nickel. Chromium and molybdenum may be added as strengtheners within prescribed limits.

Further important advantages of these steels are that they have excellent crack resistance, which enables sound welds to be readily made, and that they are low in cost as compared to the nickel base alloys.

To obtain the benefits of our invention the carbon content of the welding steel should be in the range .40–1.00%, the manganese content in the range 9.5–31% and the nickel content in the range 2.5–35%. Chromium may be employed up to 8.0%. Molybdenum may be employed up to 4.0%. The relationship of the elements should be such that Percent Mn+(percent Ni−2.5)+(½×percent Cr)≧17.4 and

Percent Mn+(2×percent Cr)+(4×percent Mo)+
(30×percent C)≦46.6

In a preferred analysis the carbon content of the welding steel is in the range 0.50–0.85%, the manganese content in the range 13.5–24% and the nickel content in the range 5.0–30% in which chromium may be employed up to 3.0% and molybdenum may be employed up to 2.0%, the relationship of the elements being such that Percent Mn+(percent Ni−2.5)+(½×percent Cr)≧18.8 and

Percent Mn+(2×percent Cr)+
(4×percent Mo)+(30×percent C)≦42.0

These limits insure a strong ductile austenitic structure that is stable to very low temperatures. Because of its stability at low temperatures it maintains its excellent impact resistance. The carbon limits are based upon the carbon required to give the desired high tensile strength while limiting the carbide forming tendency. The minimum manganese limits insure production of a stable austenite when manganese is used in conjunction with the required nickel. The maximum manganese limits are set to limit the carbide forming tendency of the manganese and because manganese tends to lose its austenitizing effect at higher levels. The minimum nickel limits in conjunction with manganese provide the stable austenite matrix. The maximum nickel limits are determined by the tendency of nickel to reduce the tensile strength and to make the attainment of the desired high strength levels more difficult. Chromium and molybdenum are valuable as strengtheners of the alloy and may be used but are not required as contributors to the stable austenite matrix. Some of the superior cryogenic plate analyses contain chromium and it is highly desirable that the weld deposit accommodate melted base metal some of which is is always incorporated into the deposit.

The minimum values set on the factor

Percent Mn+(percent Ni−2.5)+(½×percent Cr)

are required to insure a stable austenite. All these elements contribute to the stability of the austenite and are partial substitutes for each other within the limits specified. The maximum values set on the factor Percent Mn+(2×percent Cr)+
(4×percent Mo)+(30×percent C)

are to limit the formation of carbides which rapidly reduce the impact values.

With regard to other elements, the impurities phosphorus, sulfur and nitrogen should be kept low as in conventional chromium-nickel austeritic stainless steels. Silicon will normally be present in quantities up to 1% or more in accordance with normal metallurgical deoxidizing practices. The austenitizer copper may be present in limited quantities. Cobalt may be present in limited quantities without adversely affecting the properties.

The combination of strength and impact properties of our improved welding steel is appreciably better than that of the prior austenitic welding steels. Specific examples of our improved welding steels are given in the following table:

| | Examples | | | | | |
|---|---|---|---|---|---|---|
| | 1 | 2 | 3 | 4 | 5 | 6 |
| Chemistry: | | | | | | |
| C | .65 | .70 | .67 | .62 | .62 | .44 |
| Mn | 15.2 | 14.7 | 19.5 | 21.1 | 21.1 | 18.2 |
| Ni | 8.8 | 7.3 | 3.2 | 11.2 | 22.4 | 19.4 |
| Cr | | | | | | 6.7 |
| Mo | | 1.1 | | | | |
| Value of Percent Mn+(Percent Ni−2.5)+(½×Percent Cr) | 21.5 | 19.5 | 20.2 | 29.8 | 41.0 | 38.5 |
| Value of Percent Mn+(2×Percent Cr)+(4×Percent Mo)+(30×Percent C) | 34.7 | 40.1 | 39.6 | 39.7 | 39.7 | 44.8 |
| Tensile Bolt Properties: | | | | | | |
| Ultimate Strength (ksi) | 103 | 115 | 119 | 101 | 97 | 102 |
| Yield Strength (ksi) | 62 | 73 | 69 | 75 | 75 | 75 |
| Elongation (Percent) | 59 | 48 | 55 | 35 | 26 | 22 |
| Reduction of Area (Percent) | 52 | 37 | 37 | 28 | 35 | 57 |
| Charpy V Notch (ft. lbs.) Impact Values: | | | | | | |
| 72° F | 118+ | 118+ | 92 | 84 | 66 | 73 |
| −320° F | 58 | 53 | 35 | 39 | 42 | 43 |

In the above table the tensile bolt properties were measured at room temperature. At lower temperatures the yield strengths and ultimate strengths will rise in accordance with the known behavior of ferrous materials.

Our steels are of high strength and have excellent notch toughness as shown by the high impact values at −320° F., this being due to the employment of alloying elements in the relationships specified. Many of the analyses which exemplify this invention show impact values well beyond the required 20 foot pounds at −320° F. and can therefore be used at still lower temperatures before their margin of safety is exhausted.

The deposit analyses disclosed can be produced by the various known methods of manual and automatic welding. They can be produced from solid wire or tubular wire.

While we have described certain present preferred embodiments of the invention it is to be distinctly understood that the invention is not limited thereto but may be otherwise variously embodied within the scope of the following claims.

We claim:
1. A ferrous weld deposit possessed of good notch toughness and high tensile strength at −320° F. having substantially the following composition:

| | Percent |
|---|---|
| C | 0.40–1.00 |
| Mn | 9.5–31 |
| Ni | 2.5–35 |
| Cr | 0–8.0 |
| Mo | 0–4.0 | in which

Percent Mn+(percent Ni−2.5)+(½ ×percent Cr)≧17.4 and

Percent Mn+(2×percent Cr)+
    (4×percent Mo)+(30×percent C)≦46.6

2. A ferrous weld deposit possessed of good notch toughness and high tensile strength at −320° F. having substantially the following compositions:

| | Percent |
|---|---|
| C | 0.50–0.85 |
| Mn | 13.5–24 |
| Ni | 5.0–30 |
| Cr | 0–3.0 |
| Mo | 0–2.0 | in which

Percent Mn+(percent Ni−2.5)+(½ ×percent Cr)≧18.8 and

Percent Mn+(2×percent Cr)+
    (4×percent Mo)+(30×percent C)≦42.0

3. A structure comprising ferrous metal elements welded together, the weld being ferrous and possessed of good notch toughness and high tensile strength at −320° F. and having substantially the following composition:

| | Percent |
|---|---|
| C | 0.40–1.00 |
| Mn | 9.5–31 |
| Ni | 2.5–35 |
| Cr | 0–8.0 |
| Mo | 0–4.0 | in which

Percent Mn+(percent Ni−2.5)+(½ ×percent Cr)≧17.4 and

Percent Mn+(2×percent Cr)+
    (4×percent Mo)+(30×percent C)≦46.6

4. A structure comprising ferrous metal elements welded together, the weld being ferrous and possessed of good notch toughness and high tensile strength at −320° F. and having substantially the following composition:

| | Percent |
|---|---|
| C | 0.50–0.85 |
| Mn | 13.5–24 |
| Ni | 5.0–30 |
| Cr | 0–3.0 |
| Mo | 0–2.0 | in which

Percent Mn+(percent Ni−2.5)+(½ ×percent Cr)≧18.8 and

Percent Mn+(2×percent Cr)+
    (4×percent Mo)+(30×percent C)≦42.0

References Cited by the Examiner

UNITED STATES PATENTS

| 1,561,306 | 11/1925 | Brace | 75—128 |
| 2,706,696 | 4/1955 | Payson | 75—128 X |
| 2,815,280 | 12/1957 | Clarke | 75—128 |
| 2,855,660 | 10/1958 | De Long et al. | 75—123 X |

H. BIZOT, *Primary Examiner.*